United States Patent
Akhalwaya et al.

(10) Patent No.: US 11,687,724 B2
(45) Date of Patent: Jun. 27, 2023

(54) WORD SENSE DISAMBIGUATION USING A DEEP LOGICO-NEURAL NETWORK

(71) Applicant: International Business Machines Corporation, Armonk, NY (US)

(72) Inventors: Ismail Yunus Akhalwaya, Emmarentia (ZA); Naweed Aghmad Khan, Johannesburg (ZA); Francois Pierre Luus, Wierdapark (ZA); Ndivhuwo Makondo, Pretoria (ZA); Ryan Nelson Riegel, Carrollton, GA (US); Alexander Gray, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 17/039,133

(22) Filed: Sep. 30, 2020

(65) Prior Publication Data
US 2022/0100962 A1 Mar. 31, 2022

(51) Int. Cl.
*G06F 16/00* (2019.01)
*G06F 17/00* (2019.01)
(Continued)

(52) U.S. Cl.
CPC ............ *G06F 40/30* (2020.01); *G06F 40/205* (2020.01); *G06F 40/247* (2020.01); *G06N 3/04* (2013.01); *G06N 3/08* (2013.01)

(58) Field of Classification Search
CPC ........... G06F 40/30; G06F 16/00; G06F 17/00
See application file for complete search history.

(56) References Cited

U.S. PATENT DOCUMENTS

| 5,317,507 A | 5/1994 | Gallant |
| 5,606,646 A | 2/1997 | Khan |

(Continued)

FOREIGN PATENT DOCUMENTS

| CN | 102306144 A | 1/2012 |
| CN | 110321434 A | 10/2019 |

(Continued)

OTHER PUBLICATIONS

Huang, et al., "GlossBERT: BERT for Word Sense Disambiguation with Gloss Knowledge", Proceedings of the 2019 Conference on Empirical Methods in Natural Language Processing and the 9th International Joint Conference on Natural Language Processing, pp. 3509-3514, <https://www.aclweb.org/anthology/D19-1355.pdf>.

(Continued)

*Primary Examiner* — Shreyans A Patel
(74) *Attorney, Agent, or Firm* — Michael A. Petrocelli (57) ABSTRACT

Word sense disambiguation using a glossary layer embedded in a deep neural network includes receiving, by one or more processors, input sentences including a plurality of words. At least two words in the plurality of words are homonyms. The one or more processors convert the plurality of words associated with each input sentence into a first vector including possible senses for the at least two words. The first vector is then combined with a second vector including a domain-specific contextual vector associated with the at least two words. The combination of the first vector with the second vector is fed into a recurrent deep logico-neural network model to generate a third vector that includes word senses for the at least two words. A threshold is set for the third vector to generate a fourth vector including a final word sense vector for the at least two words.

17 Claims, 7 Drawing Sheets

(51) Int. Cl.
*G06F 40/30* (2020.01)
*G06N 3/04* (2023.01)
*G06F 40/247* (2020.01)
*G06F 40/205* (2020.01)
*G06N 3/08* (2023.01)

(56) References Cited

U.S. PATENT DOCUMENTS

| | | | |
|---|---|---|---|
| 6,564,198 B1 | 5/2003 | Narayan | |
| 10,460,229 B1 | 10/2019 | Yuan | |
| 2011/0093256 A1* | 4/2011 | Williams | G06F 40/30 704/9 |
| 2012/0166414 A1* | 6/2012 | Decker | G06F 16/958 707/738 |
| 2014/0095411 A1* | 4/2014 | Lamba | G06F 40/30 706/12 |
| 2016/0292145 A1* | 10/2016 | Azzi | G06F 40/30 |
| 2017/0323203 A1* | 11/2017 | Matusov | G06F 16/1794 |
| 2018/0046764 A1* | 2/2018 | Katwala | G16H 15/00 |
| 2020/0073996 A1* | 3/2020 | Wright | G06N 5/022 |

FOREIGN PATENT DOCUMENTS

| | | | | |
|---|---|---|---|---|
| WO | WO-0210985 A2 * | 2/2002 | | G06F 16/353 |
| WO | WO-2015113578 A1 * | 8/2015 | | G06F 17/273 |
| WO | WO-2016147034 A1 * | 9/2016 | | G06F 17/271 |
| WO | WO-2021124490 A1 * | 6/2021 | | |

OTHER PUBLICATIONS

Liu, et al., "Incorporating Glosses into Neural Word Sense Disambiguation", Proceedings of the 56th Annual Meeting of the Association for Computational Linguistics, Melbourne, Australia, Jul. 15-20, 2018, pp. 2473-2482, <https://www.aclweb.org/anthology/P18-1230.pdf>.

Mell et al., "The NIST Definition of Cloud Computing", National Institute of Standards and Technology, Special Publication 800-145, Sep. 2011, 7 pages.

Wang, et al., "Word Sense Disambiguation: A comprehensive knowledge exploitation framework", Knowledge-Based Systems 190 (2020) 105030, 13 pages, <https://www.sciencedirect.com/science/article/pii/S0950705119304344>.

\* cited by examiner

WORD SENSE DISAMBIGUATION USING A DEEP LOGICO-NEURAL NETWORK

BACKGROUND

The present invention generally relates to the field of artificial intelligence (AI), and more particularly to a method, system and computer program product for word sense disambiguation using a glossary layer embedded in a deep neural network (DNN) as a logical neural network (LNN) layer.

Neuro-symbolic reasoning systems aim to bridge the gap that exists between two of AI's most studied disciplines: principled, deductive inference via any of various systems of formal logic and data-driven, gradient-optimized neural network architectures. Both paradigms bear a number of important strengths and weaknesses. Notably, formal logic is interpretable, verifiable, and broadly generalizable, though it is computationally intensive if not undecidable, requires extensive domain expert input, and can be derailed by even minor inconsistencies. Neural networks, on the other hand, perform well even for unprocessed and/or noisy data, require little human configuration, and can run efficiently in parallel.

SUMMARY

The present disclosure recognizes the shortcomings and problems associated with neuro-symbolic reasoning systems and neural networks each requiring large training datasets, being vulnerable to adversarial attacks, and having an uninterpretable black-box nature. However, by merging the two disciplines, it may be possible to exploit either's strengths while mitigating their weaknesses. Therefore, there is a need for a method and system for word sense disambiguation (e.g., the separation of homonyms and heteronyms) that uses neuro-symbolic logical neural networks to provide symbolically interpretable learning that incorporates reasoning and knowledge for understanding the meaning of words from the context in which they are used, as facilitated by a statistical glossary layer implemented as a neural network layer or as an LNN layer.

Shortcomings of the prior art are overcome and additional advantages are provided through the provision of a method, system, and computer program for word sense disambiguation that provides reasoning about the correct word semantics by consulting a wordnet-type knowledge base and incorporating statistical information by the use of context and supervised weight learning.

According to an embodiment of the present disclosure, a computer-implemented method for word sense disambiguation includes receiving, by one or more processors, input sentences including a plurality of words. At least two words in the plurality of words are homonyms. The plurality of words associated with each input sentence are converted into a first vector that includes possible senses for the at least two words. The first vector is then combined with a second vector that includes a domain-specific contextual vector associated with the at least two words. The combination of the first vector with the second vector is fed into a recurrent deep logico-neural network model to generate a third vector that includes word senses for the at least two words. A threshold is set for the third vector to generate a fourth vector including a final word sense vector for the at least two words.

Another embodiment of the present disclosure provides a computer program product for word sense disambiguation, based on the method described above.

Another embodiment of the present disclosure provides a computer system for word sense disambiguation, based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
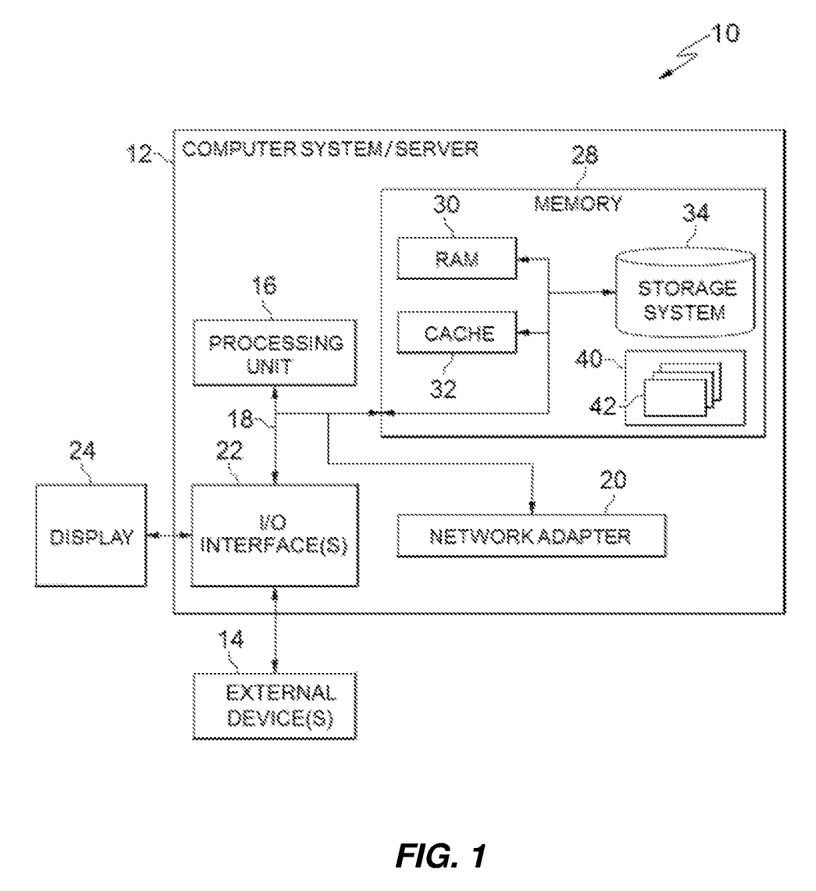
FIG. 1 is a block diagram of internal and external components of a computer system, according to an embodiment of the present disclosure.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
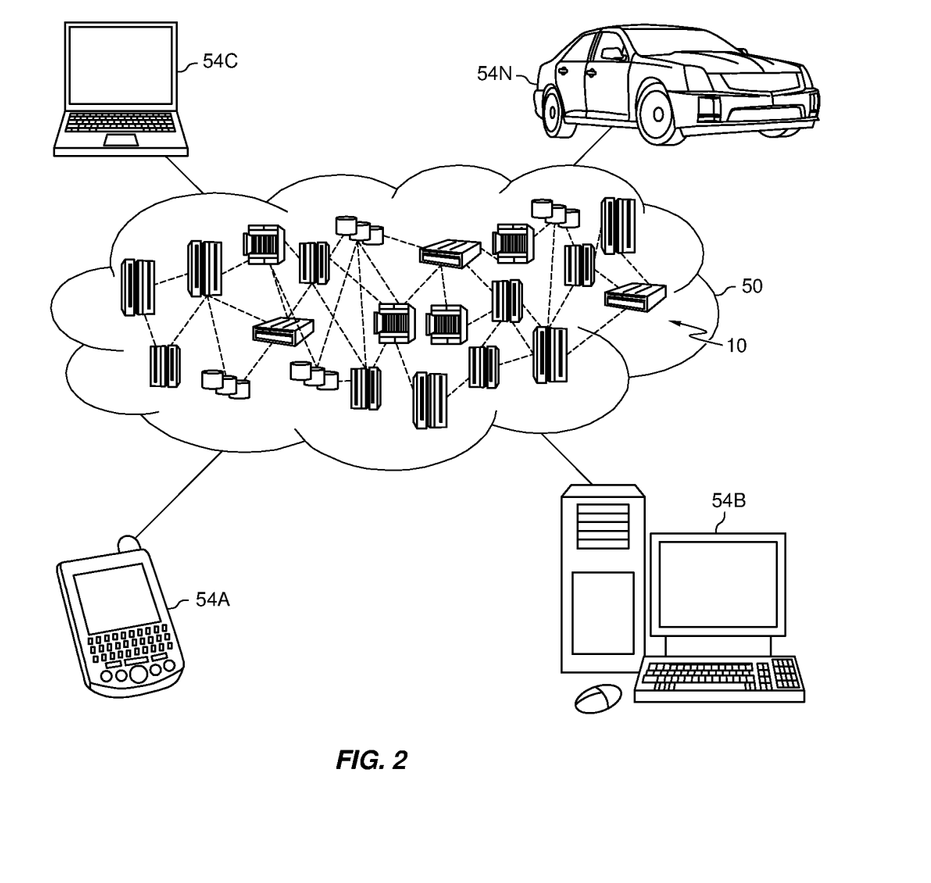
FIG. 2 is a block diagram of an illustrative cloud computing environment, according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
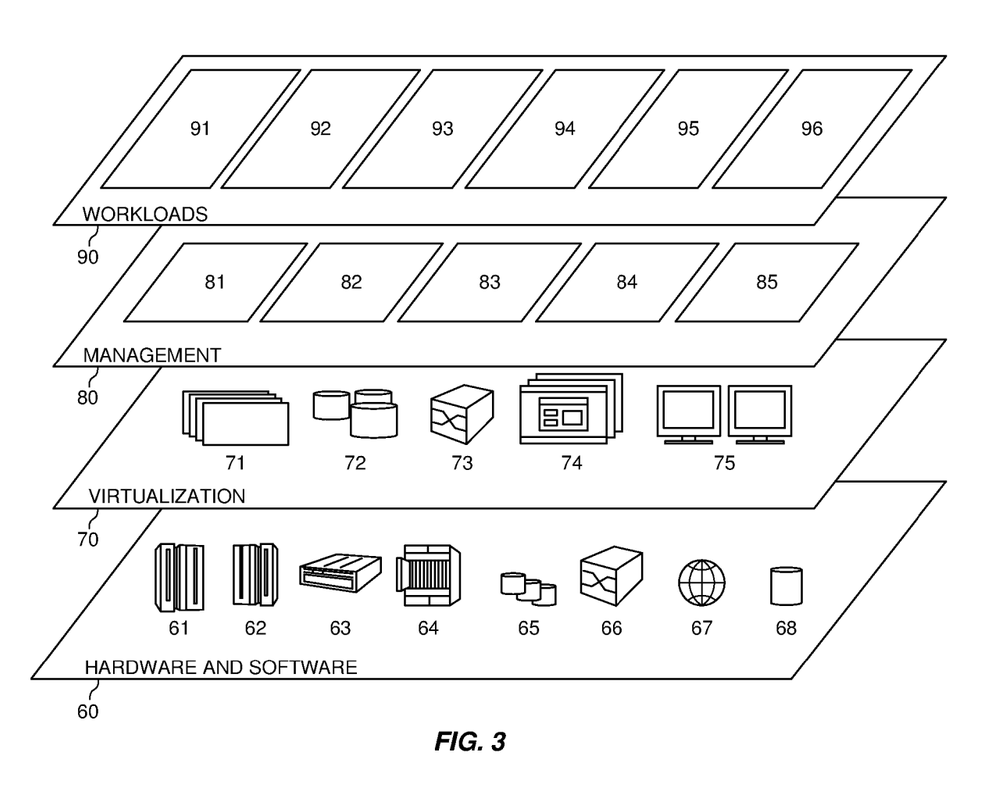
FIG. 3 is a block diagram of functional layers of the illustrative cloud computing environment of FIG. 2, according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and word-sense disambiguation 96.

The combination of neuro-symbolic reasoning systems and neural networks provides advantages for word sense disambiguation (WSD) applications. Particularly, the use of neuro-symbolic logical neural networks can provide symbolically interpretable learning that incorporates reasoning and knowledge for selecting the meanings of words based on the context in which they are used. This can be done by incorporating a statistical glossary layer implemented as a logical neural network (LNN) layer. In some cases the statistical glossary layer can also be implemented as a neural network layer.

LNNs, for which neurons model a rigorously defined notion of weighted fuzzy or classical logic, are arranged in a one-to-one correspondence with operations in a knowledge base (KB) of logical formulae. This makes LNNs capable of inference in any direction, i.e., via normal evaluation, modus ponens, conjunction elimination, and all related inference rules. The inference rules are achieved through the enforcement of constraints on neuron activations, defined as a form of continuous classical logic, suitable for automated learning and are guaranteed to behave classically given typical inputs.

An application of neuro-symbolic LNN systems is to address the problem of homographs disambiguation or word sense disambiguation, i.e., words that share the same spelling but have different senses (meanings), as defined by the context in which they appear (e.g., "Bat" as in the animal vs. sporting equipment "the bat flew out of a small opening" vs. "He hit the ball with the bat"). The present embodiments embed a statistical glossary layer into a deep neural network to separate homographs in a symbolically interpretable way.

Therefore, embodiments of the present invention provide a method, system, and computer program product for word sense disambiguation using a glossary layer embedded in a deep neural network (DNN) as an LNN layer or as a neural layer. The following described exemplary embodiments provide a system, method, and computer program product to, among other things, construct a deep learning architecture by interleaving an LNN layer with a fully connected neural layer, training with end-to-end, unravelled, recurrent back-propagation, performing word sense disambiguation by converting a textual sentence into a possible-senses word vector that is combined with a domain-specific contextual vector, using this combination as input for a recurrent deep logico-neural network, and thresholding the final vector to produce a final word sense vector (which could also include "double meanings", representing the network "laughing").

Thus, the present embodiments have the capacity to improve the technical field of artificial intelligence by providing interpretable logico-neural word sense disambiguation for properly understanding the meaning of words by using logical neural network layers (i.e., "reasoning" layers) interleaved with classical neural network layers (i.e., "context" layers).

Accordingly, embodiments of the present disclosure can separate word senses based on the context in which they are used, while learning from glossary definitions that appear in a dictionary knowledge base (e.g., WordNet). Specifically, the present embodiments perform reasoning about the correct word semantics by consulting a wordnet-type knowledge base and incorporating statistical information by using context and supervised weight learning.

The primary objective of word sense disambiguation (WSD) is to separate a homograph (or homophone in the case of speech processing) for a given context, e.g., "the bat flew out of the cave" implies bat (bat % 1:05:00::), chiropteran (chiropteran % 1:05:00::) (nocturnal mouse-like mammal with forelimbs modified to form membranous wings and anatomical adaptations for echolocation by which they navigate), while "He hit the ball with the bat" implies bat (bat % 1:06:00::) (a club used for hitting a ball in various games). While the separation of these homonyms can be achieved using learning or rule-based systems, no attempts have been made to complete word sense disambiguation using neuro-symbolic or LNN-based methods.

Structurally, an LNN is a graph including the syntax trees of all formulae in the represented KB connected to each other via nodes added for each proposition. Specifically, there exists one neuron for each logical connective occurring in each formula and, in addition, one neuron for each unique proposition occurring in any formula. All neurons return pairs of values in the range [0,1] representing upper and lower bounds on the truth values of their corresponding sub-formulae and propositions. Neurons corresponding to logical connectives accept as input the output of neurons corresponding to their operands and have activation functions configured to match the connectives' truth functions. Neurons corresponding to propositions accept as input the output of neurons established as proofs of bounds on the propositions' truth values and have activation functions configured to aggregate the tightest of such bounds. Proofs for propositions may be established explicitly, e.g., as the heads of Horn clauses; however, bidirectional inference permits every occurrence of each proposition in each formula to be used as a potential proof. The LNN models negation is a passthrough node with no parameters, canonically performing:

$$NOT(x)=1-x,$$

$$AND_b=\max(0,\min(1,b-w_p(1-p)-w_q(1-q))),$$

$$OR_b=(1-(1-p)[w_p]AND_b(1-q)[w_q]),$$

$$IMPLIES_b=(1-p)[w_p]OR_bq[w_q],$$

for input predicates p, q and their corresponding weights $w_p$, $w_q$, using weighted fuzzy logics.

While LNNs can be used to provide WSD using knowledge about ontological rules that conceptually link words in a hypernymy tree, as is the case for many statistical learning systems, the following embodiments describe the use of the LNN in a deep neural network such that the LNN provides a statistically updatable reason-based glossary look-up. In some embodiments, the glossary layer can be provided by a regular neural network layer (matrix multiplication with a suitable activation function).

Both implementations take in a vector of word sense activations and return an updated vector of word sense activations. The neural network implementation does so by the normal matrix multiplication followed by activation, while the LNN implementation does so by prescribed (or learned) number of forward and backward inference cycles. More importantly though, both implementations can be updated by back-propagation.

Figure 4:
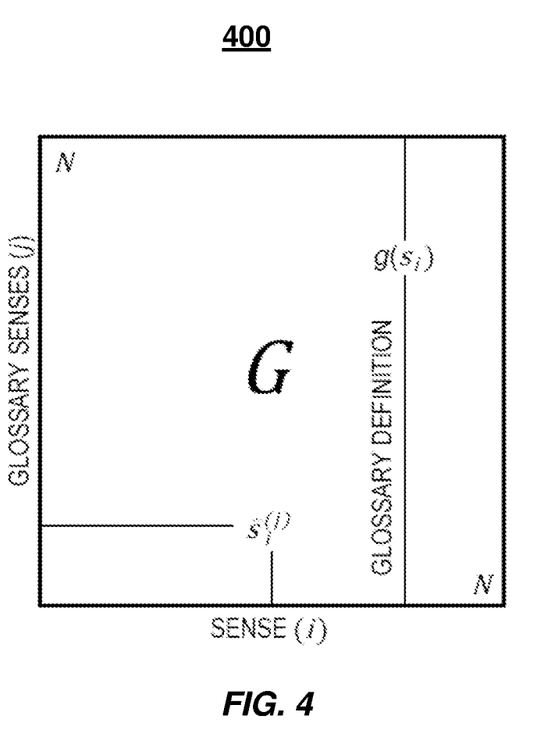
FIG. 4 depicts an example of a matrix form (G) of a glossary layer, according to an embodiment of the present disclosure.

Referring now to FIG. 4, an example of a matrix form (G) of the glossary layer is shown, according to an embodiment of the present disclosure. In this embodiment, construction of a matrix 400 (i.e., matrix G) is simplified for ease of illustration. A function g for mapping senses to an embedded vector is given by:

$$g: S \rightarrow V;$$

$$g(s_i) = \Sigma_j \hat{s}_i^{(j)};$$

S represents a set of senses (meanings);
V represents a vector space with dim (V)=dim (S)=N;
i represents a sense;
j represents a glossary definition;
$\hat{s}_i^{(j)}$ is the $j^{th}$ glossary sense of $s_i$, where the glossary's semantic sense j runs over all senses in the glossary including hyper/hyponyms, synonyms, antonyms, etc. The $i^{th}$ column of matrix G is the glossary definition of sense i ($s_i$).

In the neural network layer embodiment, the G matrix may be constructed by digesting the glossary, using ordinary neurons and activations without the requirement of logical gates.

Alternatively, a separately trained LNN may be converted into a neural network layer by activating senses one at a time, performing a few rounds of forward and backward inference and then reading off the activated senses of all other words, thereby forming a column in matrix G.

In the full LNN form, the glossary LNN layer (i.e., the glossary layer) can be constructed as a logical neural network from glossary definitions and ontological rules for conceptually linking words.

Figure 5:
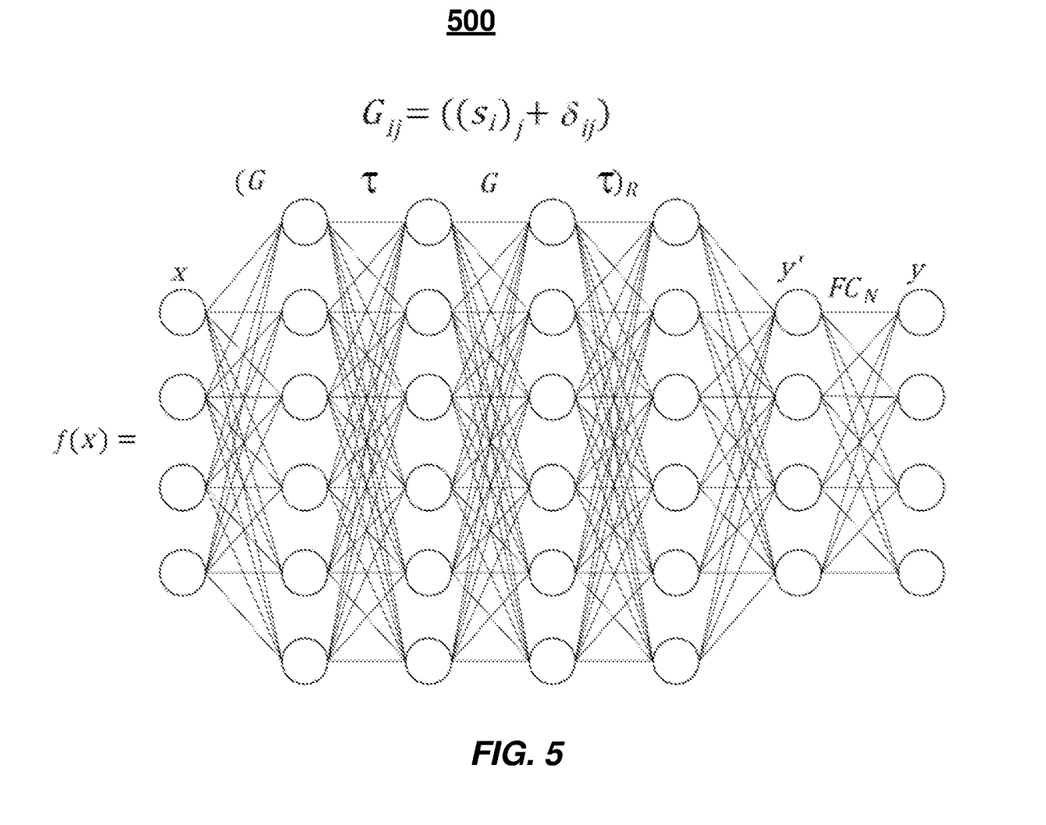
FIG. 5 depicts a logical neural network (LNN) layer from the glossary layer definition for linking words in which nodes are either traditional neurons, the output of LNN inference, or more importantly, whole LNN sub-networks, according to an embodiment of the present disclosure.

FIG. 5 depicts a logical neural network (LNN) from the glossary layer definition for linking words incorporated into a deep neural network 500 to generate a recurrent deep logico-neural network model, according to an embodiment of the present disclosure. Specifically, FIG. 5 illustrates WSD processing by jointly using a deep logico-neural network (f) for sense participation and an LNN (G) for glossary knowledge representation, in which $x = \Sigma \hat{s}_{ij}$, where x is an element-wise sum or vector input of all senses for all words in a sentence P. It should be noted that, in this embodiment, nodes are either traditional neurons, an output of LNN inference or, more importantly, whole LNN sub-networks.

Referring now to FIG. 4 and FIG. 5 simultaneously, the sentence P (not shown) includes a plurality of words $W_i$ (i.e., $P = (W_1, W_2, \ldots, W_n)$), where $W_i \subset S$ or $W_i \in P(S)$ (power set of S). Accordingly:

s.∈S is a specific sense from the set of senses (i.e., meanings);
$\hat{s}_i = \hat{e}_i \in V$ embeds a sense as a basis vector;
$s_{ij} \in W_i$ is a possible sense (j) of a word (i);
$p_i \in W_i$ is the Ground Truth sense;
R indicates recurrent repetition; and
τ prunes the activations.

In an embodiment, an input to the recurrent deep logico-neural network is tokenized to limit the number of inputs required. In an alternative embodiment, the input to the recurrent deep logico-neural network is provided in a vector form where the input represents a count of each contextual word as they appear in a fixed/sorted vocabulary.

For ease of illustration, an exemplary implementation of the previously described neural network layer embodiment for WSD is explained below. In this example, the glossary words (vocabulary), word inventory sentence (context), and glossary definitions shown in Table 1 below are used to disambiguate a small set of words:

TABLE 1

Example of WSD using neural network layer approach.

| | |
|---|---|
| Glossary Words: | exist, entity, life, difficult, rugged, ghetto-living, outdoor-living, tough |
| Word Inventory Sentence: | $P_1$ = "ghetto-living is tough"<br>$P_2$ = "outdoor-living is tough" |
| Glossary Definitions | G(exist) =exist<br>G(entity) = exist, entity<br>G(life) = exist, life<br>G(difficult) = tought__1, entity<br>G(rugged) = tought__2, entity<br>G(ghetto-living) = difficult, life<br>G(outdoor-living) = rugged, life<br>G(tough__1) = difficult<br>G(tough__2) = rugged |

For the above glossary definitions, matrix G can be constructed as shown in Table 2 below:

TABLE 2

Matrix G for example glossary terms.

| | exist | entity | life | difficult | rugged | ghetto-living | outdoor-living | tough_1 | tough_2 |
|---|---|---|---|---|---|---|---|---|---|
| exist | 1 | 1 | 1 | . | . | . | . | . | . |
| entity | . | 1 | . | 1 | 1 | . | . | . | . |
| life | . | . | 1 | . | . | 1 | 1 | . | . |
| difficult | . | . | . | . | . | 1 | . | 1 | . |
| rugged | . | . | . | . | . | . | 1 | . | 1 |
| ghetto-living | . | . | . | . | . | . | . | . | . |
| outdoor-living | . | . | . | . | . | . | . | . | . |
| tough_1 | . | . | . | 1 | . | . | . | . | . |
| tough_2 | . | . | . | . | 1 | . | . | . | . |

For the above word inventory sentence (Table 1), the input sentences and their disambiguated ground truth senses (i.e., known senses) can be constructed as illustrated in Table 3 below.

TABLE 3

Example input senses with corresponding disambiguated truth senses.

|  | P$_1$ | P$_2$ | GT$_1$ | GT$_2$ |
|---|---|---|---|---|
| exist | . | . | . | . |
| entity | . | . | . | 1 |
| life | . | . | . | . |
| difficult | . | . | . | . |
| rugged | . | . | . | . |
| ghetto-living | 1 | . | 1 | . |
| outdoor-living | . | 1 | . | 1 |
| tough_1 | 1 | 1 | 1 | . |
| tough_2 | 1 | 1 | . | 1 |

By passing the input sentences twice through matrix G, the output shown in Table 4 can be retrieved.

TABLE 4

Matrix G output.

|  | G(P$_1$) | G(P$_2$) | GT$_1$ | GT$_2$ |  | G(G(P$_1$)) | G(G(P$_2$)) | GT$_1$ | GT$_2$ |
|---|---|---|---|---|---|---|---|---|---|
| exist | . | . | . | . | exist | 1 | 1 | . | . |
| entity | . | . | . | . | entity | 3 | 3 | . | . |
| life | 1 | 1 | . | . | life | 2 | 2 | . | . |
| difficult | 2 | 1 | . | . | difficult | 2 | 1 | . | . |
| rugged | 1 | 2 | . | . | rugged | 1 | 2 | . | . |
| ghetto-living | 1 | . | 1 | . | ghetto-living | . | . | 1 | . |
| outdoor-living | . | 1 | . | 1 | outdoor-living | . | . | . | 1 |
| tough_1 | 1 | 1 | 1 | . | tough_1 | 2 | 1 | 1 | . |
| tough_2 | 1 | 1 | . | . | tough_2 | 1 | 2 | . | 1 |

Consequently, due to "forgetting" the input context to the recurrent deep logico-neural network, the matrix G is modified to include a contextual identity (i.e., the identity matrix) which results in an updated matrix G, as shown in Table 5 below.

TABLE 5

Resulting matrix G for example glossary terms.

|  | exist | Entity | life | difficult | rugged | ghetto-living | outdoor-living | tough_1 | tough_2 |
|---|---|---|---|---|---|---|---|---|---|
| exist | 2 | 1 | 1 | . | . | . | . | . | . |
| entity | . | 2 | . | 1 | 1 | . | . | . | . |
| life | . | . | 2 | . | . | 1 | 1 | . | . |
| difficult | . | . | . | 1 | . | 1 | . | 1 | . |
| rugged | . | . | . | . | 1 | . | 1 | . | 1 |
| ghetto-living | . | . | . | . | . | 1 | . | . | . |
| outdoor-living | . | . | . | . | . | . | . | . | . |
| tough_1 | . | . | . | 1 | . | . | . | . | . |
| tough_2 | . | . | . | . | 1 | . | . | . | . |

By applying this "remembering" matrix G to the calculation $f(x)=(G+I)(x)$ and subsequent passes through the recurrent deep logico-neural network (e.g., $f(x)=(G+I)((G+I)(x)))$, the resulting matrix G is capable of retrieving the disambiguated words by simply calculating a maximum (Max) across synsets of words to disambiguate from the original sentence P.

TABLE 6

Resulting matrix G output.

| | $G(P_1)$ | $G(P_2)$ | $GT_1$ | $GT_2$ | | $G(G(P_1))$ | $G(G(P_2))$ | $GT_1$ | $GT_2$ |
|---|---|---|---|---|---|---|---|---|---|
| exist | . | . | . | . | exist | 1 | 1 | . | . |
| entity | . | . | . | . | entity | 3 | 3 | . | . |
| life | 1 | 1 | . | . | life | 4 | 4 | . | . |
| difficult | 2 | 1 | . | . | difficult | 6 | 3 | . | . |
| rugged | 1 | 2 | . | . | rugged | 3 | 6 | . | . |
| ghetto-living | 2 | . | 1 | . | ghetto-living | 5 | . | 1 | . |
| outdoor-living | . | 2 | . | 1 | outdoor-living | . | 5 | . | 1 |
| tough_1 | 2 | 2 | 1 | . | tough_1 | 7 | 6 | 1 | . |
| tough_2 | 2 | 2 | . | 1 | tough_2 | 6 | 7 | . | 1 |

After a few iterations of matrix G, the entire vector may become activated since the few-degrees of separation phenomenon is present in the glossary. This would lead to the signal being drowned by high occurrence effects (as represented by the "largest eigenvalue"). Therefore, in an embodiment, activation pruning ($\tau$) may be interleaved with matrix G to form the recurrent repetition structure (R) of the full recurrent deep logico-neural network structure. Activation pruning may also be implemented using attention-based methods.

By doing this, embodiments of the present disclosure can disambiguate word senses to learn the meanings of words from glossary definitions and apply contextual sentences to decompose participation in a glossary neural network layer or LNN layer and statistical occurrence in a pruning layer.

Thus, by applying neuro-symbolic logical neural networks, embodiments of the present disclosure can achieve symbolically interpretable learning that incorporates human knowledge and reasoning about facts to identify sense participation. Further, the present embodiments can map an LNN neural-rule-based knowledge system into a glossary-matrix format to incorporate LNN rules into a more quickly differentiable format to be included in a DNN, and jointly train a logical neural network and deep neural network concurrently, to disambiguate word senses.

Accordingly, the proposed embodiments incorporate multi-directional inference for the LNN and backpropagation for the DNN, to ensure a self-consistent representation of knowledge rules and weighted learning of contextual participation and pruning to disambiguate synsets.

DNNs can be jointly or separately trained such that updates to the differentiable portion of each network may selectively choose-to or not-to affect the weight updates of the other network component. Additionally, the present embodiments allow the construction of a DNN model architecture in which parameters across the DNN are shared in a recurrent format.

Embodiments of the present disclosure incorporate the identity of contextual sentences (also referred to as "remembering") into the glossary layers, thereby ensuring a residual propagation of activations that allows the recurrent deep logico-neural network model to output an accumulation of signals for all input words fed into the model.

In an embodiment, the LNN provides to the recurrent deep logico-neural network an extra feature associated with each sense, namely proof frequency, which is a counter for the number of valid proof aggregations performed at the sense over the recurrent multi-directional inference of the system.

In an embodiment, glossary layers can be interleaved with pre-trained co-occurrence matrices.

Figure 6A:
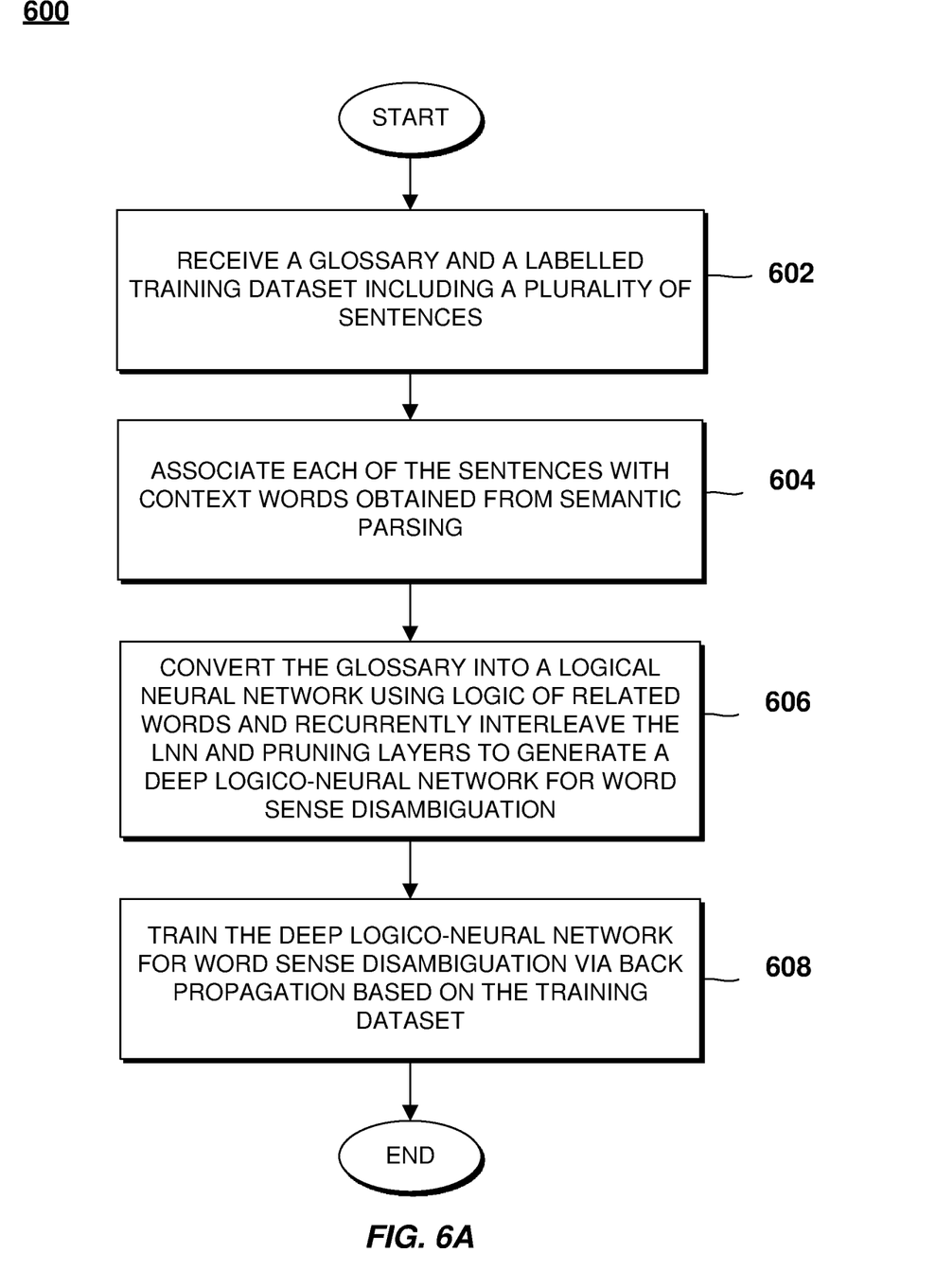
FIG. 6A depicts a flowchart illustrating the steps of a computer-implemented method for training the recurrent deep logico-neural network model for word sense disambiguation, according to an embodiment of the present disclosure.

Referring now to FIG. 6A, a flowchart 600 illustrating the steps of a computer-implemented method for training the recurrent deep logico-neural network model for word sense disambiguation is shown, according to an embodiment of the present disclosure.

The training process starts at step 602 by receiving a glossary/dictionary and a labelled/supervised training dataset that may include a plurality of sentences (hereinafter "sentences"). Each sentence includes a text sequence of two or more words, and at least two words in each text sequence are homonyms. The training dataset also contains the ground-truth sense, namely which sense is the correct meaning. At step 604, each sentence is associated with context words obtained from other semantic parsing including, but not limited to, natural language processing (NLP), and/or audio and video data (if available and directly associated with each sentence) processing techniques. These context words include subject/speaker and object identification, time/location and mood/tone associated with each sentence.

At step 606, the glossary is converted into an LNN network (i.e., a glossary LNN) using the logic of related words. The LNN network and pruning layers are interleaved recurrently to create a recurrent deep logico-neural network as shown in FIG. 5. The recurrent deep logico-neural network model is then trained, at step 608, on the dataset to predict the given ground-truth meanings. Since the glossary LNN is itself a neural network, the entire network is end-to-end differentiable and therefore trainable via back-propagation. The trained glossary LNN can be viewed as matrix G (FIG. 4) and, in one embodiment, may even literally be converted into such a matrix and tweaked further. More particularly, the recurrent deep logico-neural network is trained, at step 608, using back-propagation based on the supervised training dataset of step 602.

After completing all training, the glossary LNN/matrix G captures logical relationships between words while the pruning layers capture statistical occurrences of words in the training textual corpus and the manner in which context alters possible meanings.

Figure 6B:
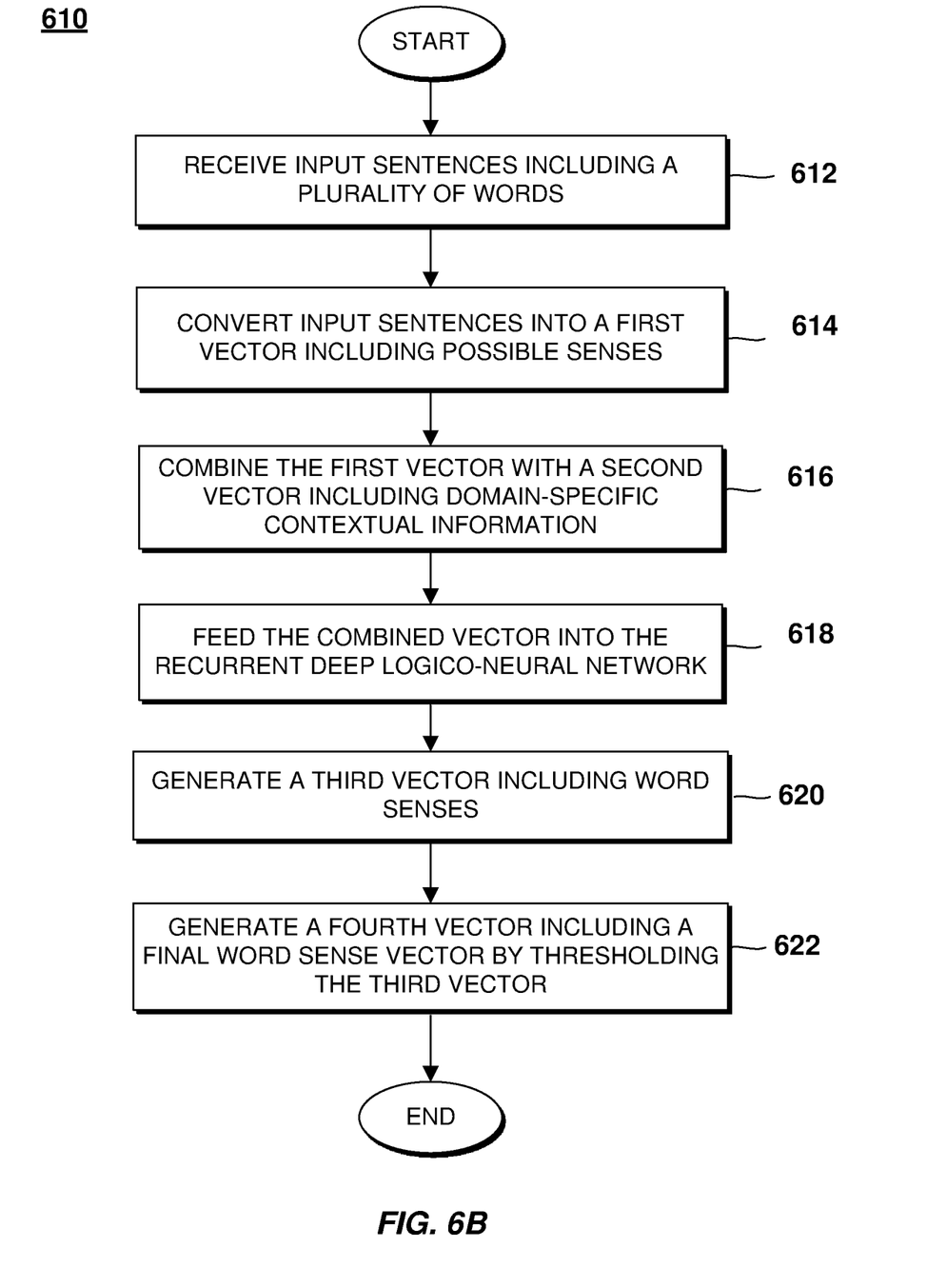
FIG. 6B depicts a flowchart illustrating the steps of a computer-implemented method for using the recurrent deep logico-neural network model of FIG. 6A for word sense disambiguation, according to an embodiment of the present disclosure.

Referring now to FIG. 6B, a flowchart 610 illustrating the steps of a computer-implemented method for using the recurrent deep logico-neural network model of FIG. 6A for word sense disambiguation is shown, according to an embodiment of the present disclosure.

The inference process starts at step 612 by receiving input sentences including a plurality of words. The plurality of words in each input sentence may include at least two words that are homonyms. At step 614, the plurality of words associated with each input sentence are converted into a first vector that includes possible senses for the at least two words in the plurality of words. The first vector is combined at step 616 with a second vector including a domain-specific contextual vector associated with the at least two words. Specifically, the first vector includes all possible senses or meanings for the at least two words while the second vector includes domain-specific context words from the plurality of words.

At step 618, the combined vector is fed into the (trained) recurrent deep logico-neural network model to generate, at step 620, a third vector including word senses for the at least two words. Stated differently, an output of the recurrent deep logico-neural network model generates the third vector representing word senses for the at least two words.

Finally, at step 622, a fourth vector including final word senses for the at least two words is generated by setting a threshold on the third vector. According to an embodiment, the threshold is set based on a maximum value across synsets in the plurality of words. Thus, the proposed method selects the largest or maximum elements in the third vector and returns the fourth vector including the maximum elements of the array, which represent the final word senses.

Therefore, the aforementioned embodiments allow the use of logical neurons or logical neural networks for word sense disambiguation and logic/rule-based systems that can embed knowledge about words and concepts into neural networks to provide symbolically interpretable mechanisms for understanding the way a neural network decides how words must be disambiguated. Additionally, embodiments of the present disclosure allow for large scale disambiguation of words that learn from massive knowledge bases and/or make use of statistical LNN with glossary information to do word sense disambiguation on a large scale, and can provide business opportunities within the quality assurance (QA) and semantic parsing domain to deliver better tech support where natural language processing (NLP) and natural language understanding (NLU) models can be applied to scale up the capabilities of professionals. This may include generalizing word sense disambiguation mechanisms for specialized data (e.g., medical and/or legal domains).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for word sense disambiguation, comprising:
   receiving, by one or more processors, input sentences comprising a plurality of words, wherein at least two words in the plurality of words are homonyms;
   converting, by the one or more processors, the plurality of words associated with each input sentence into a first vector comprising possible senses for the at least two words;
   combining, by the one or more processors, the first vector with a second vector comprising a domain-specific contextual vector associated with the at least two words;
   generating, by the one or more processors, a recurrent deep logico-neural network model by receiving a glossary and a labelled training dataset comprising a plurality of sentences, associating each of the sentences with context words obtained from semantic parsing, converting the glossary into a logical neural network using logic of related words, recurrently interleaving logical neural network layers and pruning layers to generate the recurrent deep logico-neural network model, and training the recurrent deep logico-neural network model using back-propagation based on the labelled training dataset;
   feeding, by the one or more processors, the combination of the first vector with the second vector into the recurrent deep logico-neural network model to generate a third vector comprising word senses for the at least two words; and
   thresholding, by the one or more processors, the third vector to generate a fourth vector comprising a final word sense vector for the at least two words.

2. The method of claim 1, wherein the context words are obtained from semantic parsing including at least one of natural language processing, and audio and video data processing techniques.

3. The method of claim 1, wherein the logical neural network layers incorporate an identity of contextual sentences into a glossary layer.

4. The method of claim 3, wherein incorporating the identity of the contextual sentences ensures a residual propagation of activation that allows the recurrent deep logico-neural network model to output an accumulation of signals for the plurality of words.

5. The method of claim 1, wherein the logical neural network layers provide an extra feature associated with each sense which is a counter for a number of valid proof aggregations.

6. The method of claim 3, wherein the glossary layer is interleaved with pre-trained co-occurrence matrices.

7. The method of claim 1, further comprising:
including, by the one or more processors, the glossary into the deep neural network as an alternating sequence of neural layers and pruning layers to generate the recurrent deep logico-neural network model for word sense disambiguation.

8. A computer system for word sense disambiguation, comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
receiving, by one or more processors, input sentences comprising a plurality of words, wherein at least two words in the plurality of words are homonyms;
converting, by the one or more processors, the plurality of words associated with each input sentence into a first vector comprising possible senses for the at least two words;
combining, by the one or more processors, the first vector with a second vector comprising a domain-specific contextual vector associated with the at least two words;
generating, by the one or more processors, a recurrent deep logico-neural network model by receiving a glossary and a labelled training dataset comprising a plurality of sentences, associating each of the sentences with context words obtained from semantic parsing, converting the glossary into a logical neural network using logic of related words, recurrently interleaving logical neural network layers and pruning layers to generate the recurrent deep logico-neural network model, and training the recurrent deep logico-neural network model using back-propagation based on the labelled training dataset;
feeding, by the one or more processors, the combination of the first vector with the second vector into the recurrent deep logico-neural network model to generate a third vector comprising word senses for the at least two words; and
thresholding, by the one or more processors, the third vector to generate a fourth vector comprising a final word sense vector for the at least two words.

9. The computer system of claim 8, wherein the context words are obtained from semantic parsing including at least one of natural language processing, and audio and video data processing techniques.

10. The computer system of claim 8, wherein the logical neural network layers incorporate an identity of contextual sentences into a glossary layer.

11. The computer system of claim 10, wherein incorporating the identity of the contextual sentences ensures a residual propagation of activation that allows the recurrent deep logico-neural network model to output an accumulation of signals for the plurality of words.

12. The computer system of claim 8, wherein the logical neural network layers provide an extra feature associated with each sense which is a counter for a number of valid proof aggregations.

13. The computer system of claim 10, wherein the glossary layer is interleaved with pre-trained co-occurrence matrices.

14. The computer system of claim 8, further comprising:
including, by the one or more processors, the glossary into the deep neural network as an alternating sequence of neural layers and pruning layers to generate the recurrent deep logico-neural network model for word sense disambiguation.

15. A computer program product for word sense disambiguation, comprising:
one or more computer readable storage media, and program instructions collectively stored on the one or more computer readable storage media, the program instructions comprising:
program instructions to receive, by one or more processors, input sentences comprising a plurality of words, wherein at least two words in the plurality of words are homonyms;
program instructions to convert, by the one or more processors, the plurality of words associated with each input sentence into a first vector comprising possible senses for the at least two words;
program instructions to combine, by the one or more processors, the first vector with a second vector comprising a domain-specific contextual vector associated with the at least two words;
program instructions to generate, by the one or more processors, a recurrent deep logico-neural network model by receiving a glossary and a labelled training dataset comprising a plurality of sentences, associating each of the sentences with context words obtained from semantic parsing, converting the glossary into a logical neural network using logic of related words, recurrently interleaving logical neural network layers and pruning layers to generate the recurrent deep logico-neural network model, and training the recurrent deep logico-neural network model using back-propagation based on the labelled training dataset;
program instructions to feed, by the one or more processors, the combination of the first vector with the second vector into the recurrent deep logico-neural network model to generate a third vector comprising word senses for the at least two words; and
program instructions to threshold, by the one or more processors, the third vector to generate a fourth vector comprising a final word sense vector for the at least two words.

16. The computer program product of claim 15, wherein the context words are obtained from semantic parsing including at least one of natural language processing, and audio and video data processing techniques, and the logical neural network layers incorporate an identity of contextual sentences into a glossary layer.

17. The computer program product of claim 15, further comprising:
   program instructions to include, by the one or more processors, the glossary into the deep neural network as an alternating sequence of neural layers and pruning layers to generate the recurrent deep logico-neural network model for word sense disambiguation.

* * * * *